Nov. 27, 1945.    J. K. MACOMBER    2,389,861
RATE DETERMINING MECHANISM
Filed Dec. 22, 1938    2 Sheets-Sheet 1

Nov. 27, 1945.   J. K. MACOMBER   2,389,861
RATE DETERMINING MECHANISM
Filed Dec. 22, 1938   2 Sheets-Sheet 2

INVENTOR
James K. Macomber
BY
Hogsett, Hearn & Campbell
ATTORNEYS

_Patented Nov. 27, 1945_

2,389,861

UNITED STATES PATENT OFFICE 2,389,861

RATE DETERMINING MECHANISM

James K. Macomber, Rockville Centre, N. Y., assignor to Arma Engineering Co., Inc., Brooklyn, N. Y., a corporation of New York Application December 22, 1938, Serial No. 247,245

12 Claims. (Cl. 235—61.5)

This invention relates to rate determining mechanism, and has particular reference to mechanism for continuously determining the varying rate of a changing quantity, in which the average trend of several immediately previously determined values of the changing quantity is utilized, which values are intermittently received. The invention is particularly adapted for determining values, such as target range rates, for use in gun fire control mechanism, although the invention is not limited to that use.

In accordance with the invention, two similar integrators are simultaneously adjusted to generate quantities at an arbitrary rate. The adjustment of one integrator is then changed, so that the indicated difference between the rate of its generated quantity and the rate of the generated quantity of the second integrator, will become equal to the indicated difference between the rate of the observed quantity and the rate of the generated quantity of the second integrator. The indicated rate of the generated quantity of the first integrator is then equal to the rate of the observed quantity.

For a more complete understanding of the invention, reference may be had to the following detailed description taken in conjunction with the accompanying drawings, in which.

Figure 1:
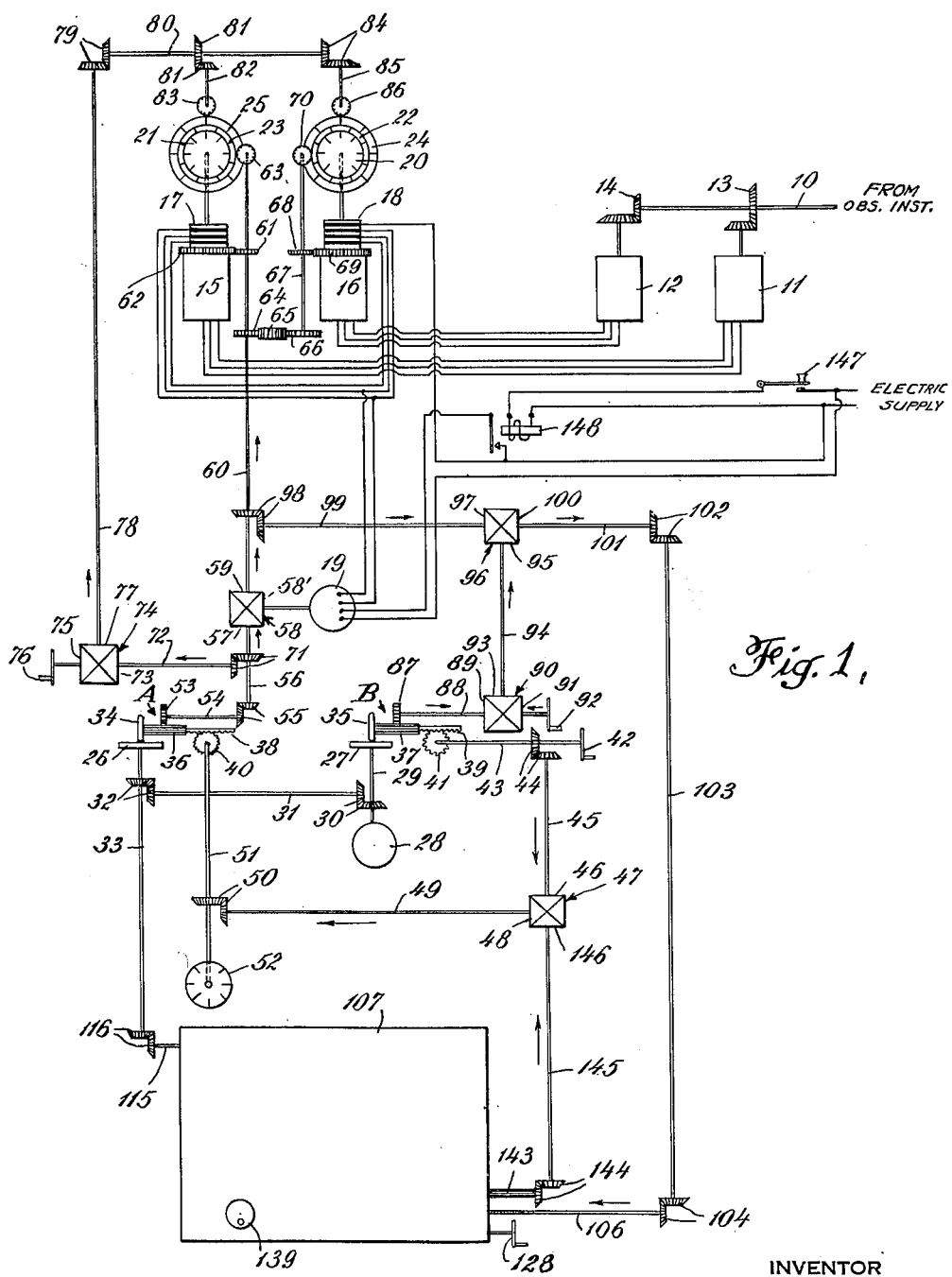
Fig. 1 is a schematic diagram of a control system and rate determining mechanism constructed in accordance with the invention.

Referring to Fig. 1 of the drawings, a local or remote observation instrument, for example, a range finder (not shown), provides inputs of a varying quantity such as target range at the shaft 10. Located at the observation instrument are respective fine and coarse control self-synchronous rotary induction transmitters 11 and 12, whose rotors are driven from the input shaft 10 through gearing 13 and 14, respectively. The transmitters 11 and 12 are electrically connected to respective fine and coarse control synchronous receivers 15 and 16, located at the rate determining mechanism of this invention, whose rotors are in angular correspondence with the rotors of the respective transmitters at all times. The receivers 15 and 16 are provided with follow-up heads 17 and 18 which control a reversible follow-up motor 19 in the manner illustrated and described in copending application Serial No. 141,189, filed May 6, 1937, by Arthur P. Davis and George Agins.

Follow-up motor 19 is responsive to the control of follow-up heads 17 and 18 only during the time that button 147, located at the observation instrument, is actuated. The actuating of button 147 operates relay 148 which allows the follow-up heads 17 and 18 to assume control of follow-up motor 19. The button 147 is actuated intermittently by the observer during the operation of the system, when satisfactory observations of the changing quantity are made.

The value of the observed quantity as received from the observation instrument is indicated by dials 20 and 21, operated by the receivers 16 and 15, respectively. Mounted concentrically with dials 20 and 21 respectively, are ring dials 22 and 23, which indicate the response of the follow-up motor 19. Outer ring dials 24 and 25, also mounted concentrically with dials 20 and 21, respectively, are provided to indicate the generated quantity of the mechanism.

The generated quantity may be set up in the rate determining mechanism by two similar integrators A and B of the roller and friction disc type. These integrators comprise the respective friction discs 26 and 27 driven at a constant speed by the motor 28 whose shaft 29 is directly connected to disc 27. Disc 26 is also driven from shaft 29 through gearing 30, shaft 31, gearing 32, and shaft 33.

Engaging the surfaces of the respective discs 26 and 27 are the rollers 34 and 35, on which are formed respective elongated gears 36 and 37. The gears 36 and 37 are journaled on shafts or pins forming extensions of racks 38 and 39, respectively, which engage the pinions 40 and 41, respectively. The positions of the rollers 34 and 35 on their respective discs 26 and 27 may be adjusted by means of a rate adjusting handle 42 directly connected to pinion 41 by a shaft 43. Rotation of the handle 42 is also transmitted from the shaft 43 through gearing 44, and shaft 45 to input gear 46 of a differential 47, whose output gear 48 is connected to a shaft 49. The output from the differential 47 is transmitted from shaft 49 through gearing 50 to shaft 51 on which pinion 40 is secured. The extent of movement of the shaft 49 and thus the rate set up in integrator A, is indicated by a dial 52 mounted on shaft 51.

Normally, the position of the rate adjusting handle 42 is such that the rollers 34 and 35 are located at the axis of rotation of their respective friction discs 26 and 27 so that they remain at rest. By turning the rate adjusting handle 42 in the proper direction, the rollers 34 and 35 may be simultaneously moved radially along their respective discs 26 and 27 in either of two directions from the center or rest position. Inasmuch as the discs 26 and 27 are driven at constant speed by motor 28, the speed of rotation of the respective rollers 34 and 35 will be directly proportional to the distance between the point of contact of each roller with its respective disc and the center of rotation of its disc. Moreover, the direction of rotation of the rollers 34 and 35 will depend on whether they are positioned to the left or right of the axis of rotation of their respective friction discs 26 and 27.

Engaging the elongated gear 36 is a pinion 53 on a shaft 54, by means of which the rotation of the roller 34 is transmitted through gearing 55 and shaft 56 to input gear 57 of a differential 58. The other input gear 58' of differential 58 is driven by the follow-up motor 19, and the output is transmitted from the differential output gear 59 through shaft 60, and gear 61 to a ring gear 62 formed on fine control follow-up head 17. The output of differential 58 is also transmitted from shaft 60 through gear 63, to ring dial 23 for indicating the response of follow-up head 17.

The output of the differential 58 is also transmitted from shaft 60, through gear 64, idler gear 65, gear 66, shaft 67 and gear 68 to ring gear 69 on coarse control follow-up head 18. The same output is also transmitted through shaft 67 and gear 70 to ring dial 22 for indicating the response of follow-up head 18.

Rotation of roller 34 of integrator A is also transmitted through gear 36, pinion 53, shaft 54, gearing 55, shaft 56, gearing 71 and shaft 72 to input gear 73 of a differential 74, whose other input gear 75 may be rotated by a handle 76 for adjusting the generated quantity indicated by the outer ring dials 24 and 25. The output of differential 74 is transmitted from differential output gear 77 through shaft 78, gearing 79, shaft 80, gearing 81, shaft 82 and gear 83 to outer ring dial 25 for indicating values of the generated quantity. The rotation of shaft 80 is also transmitted through gearing 84, shaft 85, and gear 86 to outer ring dial 24 for indicating values of the generated quantity.

Rotation of the roller 35 on integrator B is transmitted through gear 37, pinion 87 and shaft 88 to input gear 89 of a differential 90, whose other input gear 91 may be rotated by an adjusting handle 92. The output of differential 90 is transmitted from differential output gear 93 through shaft 94 to input gear 95 of a differential 96, whose other input gear 97 is rotated in accordance with inputs from shaft 60 through gearing 98 and shaft 99. Differential 96 is subtractive, so that the output from its output gear 100 is proportional to the difference between the input to input gear 97 and the input to input gear 95. Accordingly, if the integrator rollers 34 and 35 are rotating at the same speed, the output from differential output gear 100 is zero.

Figure 2:
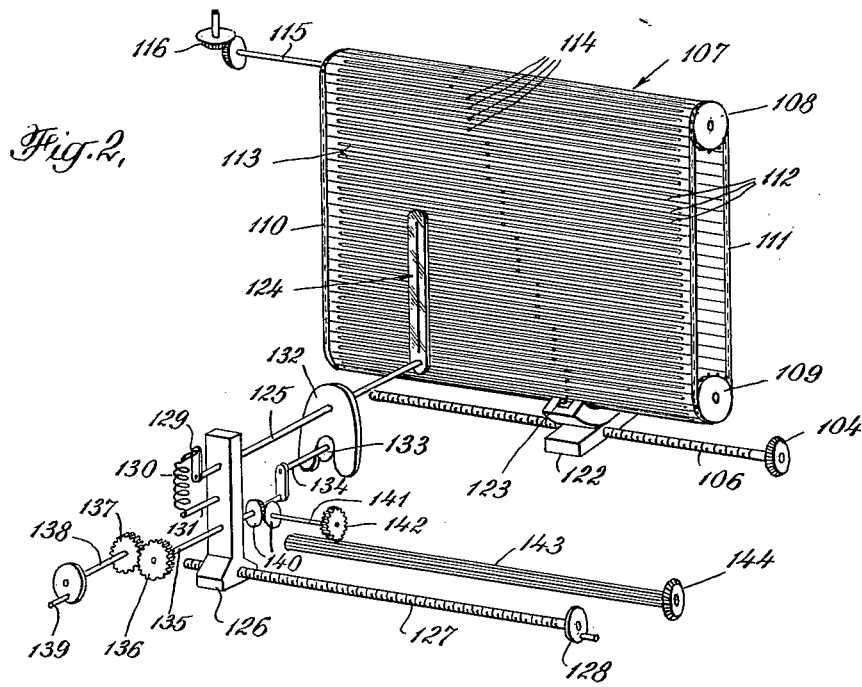
Fig. 2 is a front view in perspective of the indication or spot conveyor and associated apparatus.
Figure 3:
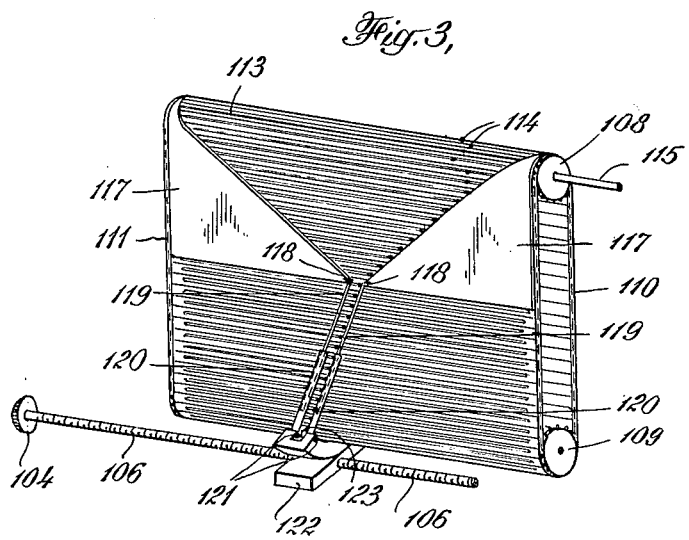
Fig. 3 is a rear view in perspective of the spot conveyor.

The output of differential 96 is transmitted from differential output gear 100 through shaft 101, gearing 102, shaft 103, and gearing 104, to a lead screw 106 in the spot conveyor 107, which is shown in greater detail in Figs. 2 and 3.

As illustrated in Figs. 2 and 3, spot conveyor 107 comprises upper and lower sprockets 108 and 109 respectively, on which the endless sprocket chains 110 and 111 are carried. The sprocket chains 110 and 111 are connected by laterally extending tubes 112, each of which is provided with a longitudinal slot 113 therein, from which a spot 114 may project, these spots 114 being pins and being movable laterally in the slots 113.

Upper sprockets 108 are mounted on shaft 115 which is driven at constant speed by the motor 28 (Fig. 1) through gearing 30, shaft 31, gearing 32, shaft 33, and gearing 116, so that the spots 114 move upwardly at constant speed on the face or front of spot conveyor 107. Inasmuch as the vertical distance from a spot to a horizontal line drawn through the point of spot release of the spot release carriage is proportional to the time interval during which the spot moved from the point of spot release to its present instantaneous position, time is measured downward along the vertical.

As is illustrated in Fig. 3, at the top rear of spot conveyor 107 is a two-piece metal shield 117 forming a V-shaped slot, the sides of which form guides for the spots 114. Pivoted at the points 118 near the apex of the V cut are a pair of downwardly extending guide rails 119, which are slidably telescoped in a pair of tubular guide rails 120 pivoted at the points 121 on the rear of the spot release carriage 122 mounted on lead screw 106. The purpose of the shield 117 and the guide rails 119 and 120 is to guide the spots 114 into slot 123 in the spot release carriage 122 wherever the carriage may be positioned along lead screw 106, so that the spots 114 will always be released from the slot 123 at the front of the spot release carriage 122.

Adjacent the front face of the spot conveyor 107 is a normally vertical, transparent pointer 124 having an opaque index line centrally positioned thereon, whose function will be described below. Pointer 124 is secured on a shaft 125 rotatably mounted in a movable support 126, carried by a lead screw 127, which may be actuated by an adjusting handle 128 for moving support 126 laterally along lead screw 127. The shaft 125 extends through support 126, and it terminates in a crank portion 129 to which one end of an upsetting spring 130 is secured, its other end being held by an arm 131 secured to the movable support 126.

On the shaft 125 is a cam 132 which is engaged by a cam follower 133 on a crank pin 134 formed on a shaft 135 rotatably journalled in the movable support 126. Secured to shaft 135 is a gear 136, meshed with gear 137 on shaft 138, which is adapted to be rotated by means of an adjusting handle 139 for actuating cam 132 to move the pointer 124. Rotation of shaft 135 is also transmitted through gearing 140, shaft 141 and gear 142 to an elongated gear 143 which is connected through gearing 144 and shaft 145 to input gear 146 of differential 47 (Fig. 1). The output of differential 47 is then transmitted from its output gear 48 through shaft 49, gearing 50, shaft 51 and pinion 40 to rack 38 of integrator A. Hence, any rotation of adjusting handle 139 acts to change the speed of rotation of roller 34 of integrator A, thereby changing its generated rate.

In operation and assuming that all of the adjusting handles are in their inoperative positions, rollers 34 and 35 of respective integrators A and B are at rest on the centers of their respective friction discs 26 and 27, pointer 124 is in its normally vertical position, and roller 133 is centrally positioned in the notch of cam 132. Under these conditions, the rotation of the observation instrument is transmitted by means of the high speed and low speed self-synchronous transmitters 11 and 12 to their respective receivers 15 and 16, which rotate the inner members of the follow-up heads 17 and 18, and the dials 21 and 20, indicating the value of the observed quantity as determined by the observation instrument.

As soon as a satisfactory observation is made, the button 147 is actuated to close its switch, thus enabling the follow-up heads 17 and 18 to assume control of follow-up motor 19 in the manner described in said copending application. The operation of the follow-up motor 19 drives the input member 58' of differential 58 and the resulting rotation of the output member 59 thereof drives the outer members of the follow-up heads 17 and 18 to their neutral positions thereby stopping the motor 19, together with ring dials 23 and 22 and input member 97 of differential 96. The resulting rotation of the output member 100 of differential 96 rotates lead screw 106 so that the spot release carriage 122 is moved horizontally to a different position on lead screw 106.

Inasmuch as the constant speed motor 28 rotates continuously, the spots 124 are carried vertically upward on spot conveyor 107 at constant speed, as viewed from the front. The vertical arrangement of the spots on conveyor 107 is not altered unless pointer 124 is inclined from its normal vertical position, as will be described. The sudden movement of the spot release carriage 122 in response to the rotation of follow-up motor 19, causes the point of spot release to be shifted, so that a new group of spots will appear, still arranged in a vertical line but displaced horizontally from the immediately preceding vertical spot group by a distance which is proportional to the angle of rotation of follow-up motor 19. The adjusting handle 76 is then turned until the indication of ring dial 24 matches the indications of ring dial 20 and ring dial 22, and the indication of ring dial 25 matches the indications of dial 21 and ring dial 23, so that the system will be in the synchronized condition.

Meanwhile, the adjusting handle 42 is turned until dial 52 indicates an arbitrary value, its direction of rotation being determined by whether the observed quantity is increasing or decreasing. Hence, the output gears 53 and 87 of respective integrators A and B will then rotate in the same direction and at the same angular velocity, so that the generated quantity of integrator A will be equal to the generated quantity of integrator B, the term generated quantity being used to designate the angle generated by the rotation of the output gears of the integrators.

The generated quantity of integrator A drives outer ring dials 24 and 25 through gear 53, shaft 54, gearing 55, shaft 56, gearing 71, shaft 72, differential 74, shafts 78, 80 and 82 to dial 25 and shaft 85 from shaft 80 to dial 24. Adjusting handle 76 may be operated when it is desired to correct the indications of the ring dials 24 and 25 to match the indications of respective observed quantity dials 20 and 21, when the button 147 is pressed to transmit the value of the changing quantity at that instant. The rotation of output gear 53 of integrator A also drives input member 57 of differential 58. Differential 58 adds the rotations of its two input members 57 and 58', so that the rotation of its output member 59, which drives input member 97 of differential 96 through gearing 98 and shaft 99, is proportional to the generated quantity of integrator A plus the rotation of follow-up motor 19.

The rotation of output gear 87 of integrator B drives the input member 89 of differential 90 which adds the rotations of its two input members 89 and 91, so that the rotation of its output member 93, which drives input member 95 of differential 96 through shaft 94 is proportional to the generated quantity of integrator B plus the rotation of adjusting handle 92. Differential 96 subtracts the angular movement of input member 95 from the angular movement of input member 97, so that the horizontal movement of the spot release carriage 122 is proportional to the difference between the angular movements of the input members 95 and 97 of differential 96. Adjusting handle 92 is operated when it is desired to shift the horizontal position of the point of spot release, as where the spot release carriage 122 is too near the left or right edges of the spot conveyor 107.

It will be evident, therefore, that as long as the outputs of both integrators A and B are equal to each other, the spot release carriage will respond only to the operation of adjusting handle 92, and to the follow-up response of follow-up motor 19. Follow-up motor 19 rotates solely in response to the difference between the change in the observed quantity and the change in the generated quantity of integrator A, which difference accumulates between successive actuations of the button 147 at the observation instrument.

If button 147 is again pressed at a subsequent satisfactory observation of the changing quantity, the operation of follow-up motor 19 will instantly modify the rotation of input member 97 of differential 96 to include the difference between the change in observed quantity, as determined by the observation instrument, and the change in the generated quantity of integrator A, which difference has accumulated since the immediately previous pressing of the button, so that the spot release carriage 122 will be moved substantially instantaneously through a distance proportional to said difference.

This will be indicated on the spot conveyor by a horizontal displacement of the spots 114 so that a new vertical spot group will be formed, which is displaced horizontally from the immediately previous spot group by a distance proportional to the difference between the change in the observed quantity, and the change in the generated quantity of integrator B, that has accumulated during the time between the two successive actuations of the button, which difference is due to the fact that the generated quantity rate of integrator A is not equal to the observed quantity rate.

In order to determine the rate of change of the observed quantity by means of the apparatus and system of this invention, it is necessary that the generated quantity rate of itegrator A be corrected so that it will be equal to the observed quantity rate. Thus, after three or four successive operations of the button 147 at the observation instrument, a number of spot 114 groups will be present on the front of the spot conveyor 107. The horizontal distance between the first or top spot 114 in a spot group and the first or top spot 114 in the immediately following spot group, represents the difference between the change in the observed quantity and the change in the generated quantity of integrator B that has occurred during the time interval between the successive actuations of the button 147. Accordingly, a tangent to the trend or curve through the first spot 114 in each successive spot group represents the instantaneous difference between the observed quantity rate and the integrator B generated quantity rate at the instant corresponding to the point of tangency.

Inasmuch as the horizontal distance between a spot 114 and the immediately following spot 114 in the same spot group represents the difference between the change in the generated quantity of integrator A, and the change in the generated quantity of integrator B that has occurred during the time interval between the releasing of the successive spots, the slope or tangent of a spot group will represent the difference between the integrator A generated quantity rate and the integrator B generated quantity rate.

The rate correction applied to integrator A must be such that the slope of a spot group will become equal to the tangent to the trend or curve through the first spot 114 in each successive spot group. When this is accomplished, the generated quantity rate of integrator A, minus the generated quantity rate of integrator B will be equal to the observed quantity rate minus the generated quantity rate of integrator B, and the generated quantity rate of integrator A will therefore be equal to the observed quantity rate.

Before any rate correction adjustment is made, the adjusting handle 139 is in the inoperative position, and the generated quantity rate of integrator A is equal to the generated quantity rate of integrator B, so that the difference between the two rates is zero. Accordingly, the tangent or slope of the spot groups is zero, and, as all angles on the spot conveyor are measured from the vertical, each spot group will be vertical.

The necessary rate correction is applied by operating the rate correction handle 139 until the pointer 124 is parallel to the tangent to the curve or trend through the first spot in each successive spot group. The tangent to the curve or trend is obtained by visual inspection, with the aid of pointer 124. This rotation of the adjusting handle 139 is transmitted through shaft 138, gears 137 and 136, shaft 135, and crank pin 134, so that roller 133 will tend to move from its central or inoperative position on cam 132, down the appropriate side of the cam face, as determined by the direction of rotation of adjusting handle 139.

As illustrated in Fig. 2, the rotation of adjusting handle 139 in a clockwise direction results in the clockwise rotation of pointer 124 about its axis of rotation, and vice versa. A small initial angular displacement of roller 133 from its central or inoperative position on cam 132 imparts rotational movement to cam 132 and its shaft 125, so that crank 129 is moved through an equal angle, thereby upsetting spring 130. The spring, upon being upset, then supplies the force for the movement of cam 132, so that the relative movement between the cam and roller causes the roller to move down the opposite side of the cam face, and the position of the roller 133 limits the angular movement of the cam. Movement of the crank arm 134 in the direction to restore roller 133 to its central inoperative position on cam 132 opposes the action of spring 130, and tends to restore the spring to its vertical inoperative position. The rotation of cam 132 and shaft 125, due to the operation of adjusting handle 139, acts to rotate the pointer 124 through the desired angle.

The cam 132 and roller 133 are so designed that a tangent relationship exists between the angular movement of pointer 124 and gearing 140. Hence, the angular departure of pointer 124 from the vertical as a result of the operation of adjusting handle 139, will rotate gearing 140, shaft 141, and its connecting gearing to input member 146 of differential 47, so that the output member 48 of differential 47 will shift the position of roller 34 radially on the face of friction disc 26 by an amount proportional to the tangent of the angle between the pointer 124 and the vertical. Moreover, since the output of the integrator A is directly proportional to the distance between the point of contact of roller 34 on its friction disc 26 and the center of disc 26, the generated quantity rate of integrator A minus the generated quantity rate of integrator B will be equal to the tangent of the angle between the pointer 124 and the vertical.

It therefore follows that when the rate of change of the generated quantity of integrator A is equal to the rate of change of the observed quantity, the spot release carriage will not be affected by actuation of button 147 at the observation instrument, so that the spots 114 will come out of the spot release carriage 122 to form a continuous line of spots, and the indication of dial 52 will then be the rate of change of the observed quantity.

The subsequent forming of spot groups in response to the operation of the button 147 at the observation instrument, will indicate that the observed quantity rate is changing. The rate of change of the observed quantity may be continuously determined by operating the adjusting handle 139 so that pointer 124 will be restored to, and maintained in, a position parallel to the trend of the spot groups.

Inasmuch as the mechanism of this invention utilizes the average trend of the observed quantity, errors in the observation of the changing quantity which are transmitted to the mechanism, will tend to be averaged. If the error is large, it will be indicated as a sudden departure from the trend and can be ignored.

The adjusting handles 42 and 139 are described as being in their inoperative positions at the time the system is initially put into operation. These adjusting handles may, however, be in any position when the system is put into operation, for it is evident that the subsequent rotation of the adjusting handles 42 and 139 during the operation of the system will produce the desired results, and will not in any manner impair the accuracy of the mechanism.

Although the mechanism of this invention has been illustrated and described for determining rates with respect to time, such as target range rates, it is not limited to that use but is capable of determining rates with respect to angle, distance, etc. Moreover, the invention is not to be limited to the specific embodiment illustrated and described above, but is capable of numerous changes and detail within the scope of the appended claims.

I claim:

1. In apparatus for determining the rate of change of a varying observed quantity, the combination of input means responsive to said observed quantity, means for generating a quantity at an arbitrarily selected rate, second means for generating a quantity at an arbitrarily selected rate, adjustable indicating mechanism driven at a predetermined rate of speed and having means for plotting a function of both said generated quantities and the observed quantity, means jointly driven by said input means and the output of said first generating means, means for combining the outputs of said last-named means and second generating means, driving connections between said combining means and the plotting means of said indicating mechanism, manual means adjustable in accordance with the slope of the plot formed by the plotting means on the indicating mechanism, and a driving connection between said manual means and one of said generating means for modifying the output of the same.

2. In apparatus for determining the rate of change of a varying observed quantity, the combination of input means responsive to said observed quantity, a plurality of means for generating a quantity at an arbitrarily selected rate, means including at least one of the rate generating means for indicating changes in the observed quantity during given intervals, adjustable indicating mechanism driven at a predetermined rate of speed and having means for plotting the difference between changes in the observed and generated quantities, manual means adjustable in accordance with the slope of the plot on the indicating mechanism, and means actuated by said manual means for adjusting at least one of the rate generating means in accordance with the slope of the plot.

3. In apparatus for determining the rate of change of a varying quantity, the combination of input means responsive to said observed quantity, means for generating a quantity at an arbitrarily selected rate, means jointly actuated by said input means and the output of said generating means for adding said changes in the variable quantity to the changes in the generated quantity, second means for generating a quantity at an arbitrarily selected rate, means jointly actuated by said first jointly actuated means and said second generating means for subtracting said second generated quantity from the sum of the change in said first generated quantity and the change in the variable quantity to provide a difference, adjustable indicating mechanism driven at a predetermined rate of speed and having plotting means, operative connections between said subtracting means and said plotting means for plotting said difference on said mechanism with said plotting means, manual means adjustable in accordance with the slope of the plot on the indicating mechanism, and means actuated by said manual means for adjusting the said first generating means to modify the output thereof.

4. In a plotting device, the combination of a movable member having a plurality of spaced, laterally-movable indicia and extending substantially normally therefrom, means for moving said member at a predetermined rate of speed, adjustable means for controlling the lateral position of the indicia on the movable member, means for actuating said adjustable means in accordance with instantaneous values of a quantity, guiding means for directing indicia to said adjustable means, and means for further moving said adjustable means in accordance with values of a second quantity.

5. In a plotting device the combination of an elongated movable member having a plurality of spaced parallel slots therein, indicia in each of said slots extending substantially normally to the surface of the member, means for moving the member longitudinally at a predetermined rate of speed, an adjustable mechanism for controlling the lateral position of the indicia in the slots, means for actuating said adjustable mechanism in accordance with instantaneous values of a quantity guides for directing indicia to the adjustable indicia controlling mechanism, and means for further moving the adjustable mechanism laterally in accordance with a second quantity.

6. In a rate determining mechanism, the combination of adjustable means for generating a quantity in accordance with changes in an observed value, second adjustable means for generating a quantity at an arbitrarily selected rate, mechanism actuated by both said means for subtracting said quantities, an element actuated by said mechanism in accordance with the difference between said quantities, a member driven at a predetermined rate of speed, adjustable means on said member for indicating a plot thereon, operative connections between said last-named adjustable means and said element for adjusting the same to change said plot in accordance with changes in said difference, manual means adjacent said member and adjustable relatively thereto in accordance with changes in the slope of the plot on said member, and operative connections between said manual means and one of said generating means for adjusting the same to change the rate of the generated quantity thereof by an amount proportional to the slope of said plot.

7. In a rate determining mechanism the combination of adjustable means for generating a quantity in accordance with changes in an observed value, second adjustable means for generating a quantity at an arbitrarily selected rate, mechanism actuated by both said means for subtracting said quantities, an element actuated by said mechanism in accordance with the difference between said quantities, a member driven at a predetermined rate of speed, adjustable means on said member for indicating a plot thereon, operative connections between said last-named adjustable means and said element for adjusting the same to change said plot in accordance with changes in said difference, manual means adjacent said member and adjustable relatively thereto in accordance with changes in the slope of the plot on said member, and operative connections between said manual means and said first generating means for adjusting the same to change the rate of the generated quantity thereof by an amount proportional to the slope of said plot.

8. In rate determining mechanism the combination of input means for determining changes in a quantity during given intervals, adjustable means for generating a quantity at an arbitrarily selected rate, means jointly driven by said input means and the output of said generating means for adding said changes in the variable quantity to the changes in the generated quantity, second adjustable means for generating a quantity at an arbitrarily selected rate, means jointly driven by said first jointly driven means and said second generating means for subtracting said last generated quantity from the sum of the changes in said first generated quantity and the change in the variable quantity to provide a difference, a movable member, means for moving the member in accordance with values of a second quantity, a plot-forming indicating means on the member, means for positioning said last-named means laterally on the member in accordance with values of the said difference to form a plot which is a function of the two quantities, means on the member manually adjustable in accordance with the slope of the plot, and means actuated by said manual means for adjusting said first generating means to change the rate of its generated quantity by an amount proportional to the slope of said plot.

9. In indicating mechanism, the combination of an endless belt provided with a plurality of spaced laterally extending slots, each slot having a movable pin extending therefrom in a direction substantially normal to the surface of the belt, means for moving the belt longitudinally at a predetermined rate, adjustable means having a slot therein for positioning pins laterally on the belt to form a plot, guiding means connected to the positioning means for directing pins into the slot therein, and means for moving the positioning means laterally adjacent the belt.

10. In rate determining mechanism, the combination of input means actuated in accordance with values of an observed quantity, adjustable means for generating a quantity varying at an estimated rate, means jointly actuated by said input means and the generating means for adding changes in the observed quantity to changes in the generated quantity, second adjustable means for generating a quantity varying at an estimated rate, means jointly driven by said jointly actuated means and said second generating means for subtracting the second generated quantity from the sum of the changes in said first generated quantity and changes in the observed quantity to provide a difference, adjustable indicating mechanism having a part driven at a predetermined rate of speed and a part adjustable relatively thereto and driven by the output of said subtracting means for plotting a function of said difference, means manually adjustable in accordance with the slope of the plot on the indicating means, and an operative connection between the manual means and said first generating means, whereby the estimated rate of said first generating means is modified by an amount proportional to the slope of the plot.

11. In rate determining mechanism, the combination of input means actuated in accordance with values of an observed quantity, adjustable means for generating a quantity varying at an estimated rate, means responsive to positional disagreement between said input means and the generating means for indicating changes in the difference between the generated quantity and the observed quantity in given intervals, means jointly actuated by said input and generating means for adding said changes in the observed quantity to changes in the generated quantity, second adjustable means for generating a quantity varying at an estimated rate, means jointly actuated by said first jointly actuated means and said second generating means for subtracting the second generated quantity from the sum of said first generated quantity and the changes in the observed quantity to provide a difference, a movable member, means for moving the member at a predetermined rate, plot-forming means on the member, means driven by the output of said second jointly actuated means in accordance with said difference for positioning said plot-forming means laterally on the member to form a plot thereon, a manually movable indicating element, and driving connections between the indicating element and said first generating means, whereby manual movement of said indicating element parallel to the slope of the plot changes the estimated rate of said first generating means by an amount proportional to the slope of the plot on the carriage.

12. In rate determining mechanism the combination of input means actuated in accordance with values of an observed quantity, adjustable means for generating a quantity at an arbitrarily selected rate, means jointly actuated by the input and generating means for indicating the difference between changes in the observed quantity and changes in the generated quantity in given time intervals, means jointly actuated by said last-named means and said generating means for adding said difference to the generated quantity, second adjustable means for generating a quantity at an arbitrarily selected rate, means jointly driven by said generating means and said second jointly actuated means for subtracting said last generated quantity from the sum of said first generated quantity and said difference to provide a second difference, a movable member, means for moving the member in accordance with values of a second quantity, plot-forming means on the member, means driven by said last-named jointly actuated means for positioning plot-forming means laterally on the member in accordance with values of the said second difference to form a plot which is the function of the two quantities, means on the member manually adjustable in accordance with the slope of the plot, and driving connections between said adjustable means and said first generating means for changing the rate of its generated quantity by an amount proportional to the slope of said plot.

JAMES K. MACOMBER.